US008843462B2

(12) United States Patent
Libert et al.

(10) Patent No.: US 8,843,462 B2
(45) Date of Patent: Sep. 23, 2014

(54) SYSTEM AND METHOD FOR MAPPING LOGICAL AND PHYSICAL ASSETS IN A USER INTERFACE

(75) Inventors: Scott Allan Libert, Tigard, OR (US); James Edward Pearce, Silchester (GB)

(73) Assignee: GVBB Holdings S.A.R.L., Luxembourg (LU)

( * ) Notice: Subject to any disclaimer, the term of this patent is extended or adjusted under 35 U.S.C. 154(b) by 710 days.

(21) Appl. No.: 12/450,671

(22) PCT Filed: Nov. 14, 2007

(86) PCT No.: PCT/US2007/023946
§ 371 (c)(1), (2), (4) Date: Oct. 2, 2009

(87) PCT Pub. No.: WO2008/127312
PCT Pub. Date: Oct. 23, 2008

(65) Prior Publication Data
US 2010/0107119 A1     Apr. 29, 2010

Related U.S. Application Data

(60) Provisional application No. 60/923,358, filed on Apr. 13, 2007.

(51) Int. Cl.
*G06F 7/00* (2006.01)
*G06F 17/30* (2006.01)

(52) U.S. Cl.
CPC ................. *G06F 17/30126* (2013.01)
USPC ............ 707/705; 715/804; 715/805; 707/706

(58) Field of Classification Search
None
See application file for complete search history.

(56) References Cited

U.S. PATENT DOCUMENTS

| 4,296,476 A | 10/1981 | Mayer et al. |
| 5,650,994 A | 7/1997 | Daley |
| 5,774,689 A | 6/1998 | Curtis et al. |
| 6,049,799 A * | 4/2000 | Mangat et al. ................ 1/1 |

(Continued)

FOREIGN PATENT DOCUMENTS

| EP | 1215593 | 6/2002 |
| GB | 2427291 | 12/2006 |

(Continued)

OTHER PUBLICATIONS

Holzner, SAMS Teach Yourself Microsoft Visual Basic .NET 2003 in 21 Days (Copyright 2003).*

(Continued)

*Primary Examiner* — Jacob F Bétit
*Assistant Examiner* — Tyler Torgrimson
(74) *Attorney, Agent, or Firm* — Arent Fox LLP

(57) ABSTRACT

The present principles provide systems and methods for displaying associations between data files and logical assets including the data files. Upon user-selection of a representation of a logical asset, a method in accordance with an aspect of the present principles includes determining associations between data files and the logical asset and displaying a listing of data files associated with the logical asset. Conversely, the method may also include presenting a listing of logical assets associated with a user-selected data file upon determination of logical assets associated with the data file. Moreover, another aspect of the present principles permits bi-directional navigation capability between a logical asset associations view and a physical asset associations view.

10 Claims, 5 Drawing Sheets

(56) References Cited

U.S. PATENT DOCUMENTS

| | | | |
|---|---|---|---|
| 6,091,430 | A | 7/2000 | Bodin et al. |
| 6,266,805 | B1 * | 7/2001 | Nwana et al. ................. 717/104 |
| 6,574,655 | B1 * | 6/2003 | Libert et al. ................. 709/200 |
| 6,754,661 | B1 * | 6/2004 | Hallin et al. ................. 707/797 |
| 7,024,681 | B1 | 4/2006 | Fransman et al. |
| 7,249,314 | B2 * | 7/2007 | Walker et al. ................. 715/205 |
| 2002/0178233 | A1 * | 11/2002 | Mastrianni et al. ........... 709/217 |
| 2004/0003011 | A1 * | 1/2004 | Broussard et al. ........... 707/204 |
| 2004/0133910 | A1 | 7/2004 | Gordon et al. |
| 2004/0143458 | A1 | 7/2004 | Pulkkinen et al. |
| 2005/0166189 | A1 * | 7/2005 | Ma ................................. 717/136 |
| 2005/0223318 | A1 * | 10/2005 | Diesel et al. ................. 715/513 |
| 2005/0288939 | A1 | 12/2005 | Peled et al. |
| 2006/0022983 | A1 * | 2/2006 | Gauthier et al. ............. 345/473 |
| 2006/0047653 | A1 * | 3/2006 | Vaidyanathan et al. .......... 707/6 |
| 2006/0112085 | A1 | 5/2006 | Zijlstra et al. |
| 2006/0129533 | A1 * | 6/2006 | Purvis ............................... 707/3 |
| 2006/0195987 | A1 | 9/2006 | Walkingshaw |
| 2006/0248111 | A1 * | 11/2006 | Park ............................... 707/102 |
| 2007/0156687 | A1 * | 7/2007 | Idicula et al. ..................... 707/8 |
| 2008/0010601 | A1 * | 1/2008 | Dachs ........................... 715/751 |
| 2008/0155517 | A1 * | 6/2008 | Yan et al. ....................... 717/140 |
| 2009/0089630 | A1 * | 4/2009 | Goldenberg et al. ......... 714/704 |
| 2011/0265058 | A1 * | 10/2011 | Wang et al. ................... 717/101 |
| 2012/0137305 | A1 * | 5/2012 | Conroy et al. ................ 719/314 |

FOREIGN PATENT DOCUMENTS

| | | | |
|---|---|---|---|
| JP | 2006195987 | A | 7/2006 |
| WO | WO0109751 | | 2/2001 |
| WO | WO0110082 | | 2/2001 |
| WO | WO0116668 | | 3/2001 |
| WO | WO0117194 | | 3/2001 |
| WO | WO2004040464 | | 5/2004 |
| WO | WO2004042563 | | 5/2004 |
| WO | 2006067612 | A1 | 6/2006 |
| WO | WO2006061251 | | 6/2006 |

OTHER PUBLICATIONS

Microsoft Visual Studio 2003 screenshots.*

Office Action issued for Japanese Patent Application No. 2010-0502989, mailed by SIPO on Sep. 11, 2012.

HomeEdge NPL Document, pp. 2-6.

International Preliminary Report on Patentability for International Application No. PCT/US2007/023946 dated Oct. 22, 2009 from the International Bureau of Wipo.

Rousseau, F. et al. "Omnisphere: a Personal Communication Environment" 36th Hawaii International Conference on Systems Sciences, 2003, IEEE Comput. Soc, Los Alamitos, Ca.

Choonhwa Lee, et al. "Context Attributes: an Approach to Enable Context-awareness for Service Discovery" Proceedings 2003 Symposium on Applications and the Internet, 2003, IEEE Comput. Soc, Los Alamitos, Ca, Usa, Isbn 0/7695-1872-9 fl.

Ponnekanti, S.R. et al. "Application-Service Interoperation with Standardized Service Interfaces" Proceedings of the First IEEE International Conference on Pervasive Computing and Communications (PerCom 2003), 2003, IEEE Comput, Soc, Los Alamitos, Ca, Usa, Isbn 0/7695-1893-1.

Miller, B.A. et al. "Home Networking with Universal Plug and Play" IEEE Communications Magazine, Dec. 2001, pp. 104-109.

* cited by examiner

SYSTEM AND METHOD FOR MAPPING LOGICAL AND PHYSICAL ASSETS IN A USER INTERFACE

This application claims the benefit, under 35 U.S.C. §365 of International Application PCT/US2007/023,946, filed 14 Nov. 2007, which was published in accordance with PCT Article 21(2) on 23 Oct. 2008, in English and which claims the benefit of U.S. provisional patent application No. 60/923,358 filed 13 Apr. 2007.

TECHNICAL FIELD

The present principles generally relate to presentation of data files stored on a storage medium, and more particularly, to systems and methods for displaying data file associations on a graphical user interface.

BACKGROUND

A common technique for permitting a user to navigate through a data storage mechanism of a computing system involves presenting a hierarchy of folders and subfolders indicating the organizational structure and location in which data files are stored. Upon selection of a particular folder, subfolders and executable files are presented to the user, thereby permitting them to determine the location of a file in a storage medium. Another means by which a user may identify the location of a file includes employing a search feature, wherein a user indicates a search term directed to a file name, text in the file, or the like. In response to a search command, known systems provide a results list, often indicating the name of the file, its location in a storage medium, its size, type and other characteristics of the file.

In accordance with some software applications, data files are utilized by associating them with other data files. For example, an interne browser application may associate a web page file with an image file by incorporating the image file in a display of the text of a webpage file. Moreover, in certain circumstances, a file may be associated with more than one file. For example, several web page files may reference a single image file stored in a separate location in a data storage medium. The location of each of these separate files may be determined by known navigation techniques and displayed, as described above.

SUMMARY

The prior art systems described above fail to provide an indication of data file associations and respective locations of associated data files within a single user interface. Furthermore, prior art systems also fail to provide a convenient and efficient bi-directional navigation capability between data compositions and associated data files within a user interface.

A data composition, as referred to herein, is a composite display or series of displays including activated data files. For example, in the interne browser application example described above, the display of a webpage may include a text webpage file, such as an HTML file, and an image file. Although both the webpage text file and the image file may be stored in separate locations on a data storage medium, the interne browser application activates, or 'opens,' both files to form a composite display including both activated data files on a user-interface.

The present principles provide systems and methods for presenting and displaying data files associated with a data composition in a single user interface. In addition, the present principles permit a user to navigate bi-directionally through representations of data files and associated data compositions. These features enable a user to determine data compositions that would be affected by editing, moving or deleting an associated data file.

One aspect of the present principles includes a method for displaying data composition associations for a user interface comprising: generating a display for a representation of a logical asset; providing a user with an option to display a listing of associated data files; and generating a display of a listing of data files associated with the logical asset. A different implementation of the present principles further includes providing a user with an option to display a listing of logical assets associated with a particular data file within the data file listing; and displaying a listing of logical assets associated with the particular data file.

Another aspect of the present principles includes a method for displaying data file associations for a user interface comprising: generating a display for a representation of a data file; providing a user with an option to display a listing of associated logical assets; and generating a display of a listing of logical assets associated with the data file. Another implementation of the present principles further includes providing a user with an option to display a listing of data files associated with a particular logical asset within the logical asset listing; and displaying a listing of data files associated with the particular logical asset.

A system for displaying associations between data files and data compositions in accordance with an aspect of the present principles includes: a first associations view including a listing of assets associated with a first asset. Moreover, in accordance with another aspect of the present principles, the system may further include a second associations view, configured to be displayed upon user-selection of a second asset listed in the first associations view, including a listing of assets associated with the second asset.

The details of one or more implementations are set forth in the accompanying drawings and the description below. Even if described in one particular manner, it should be clear that implementations may be configured in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

BRIEF DESCRIPTION OF THE DRAWINGS

The teachings of the present principles can be readily understood by considering the following detailed description in conjunction with the accompanying drawings, in which.

Figure 1:
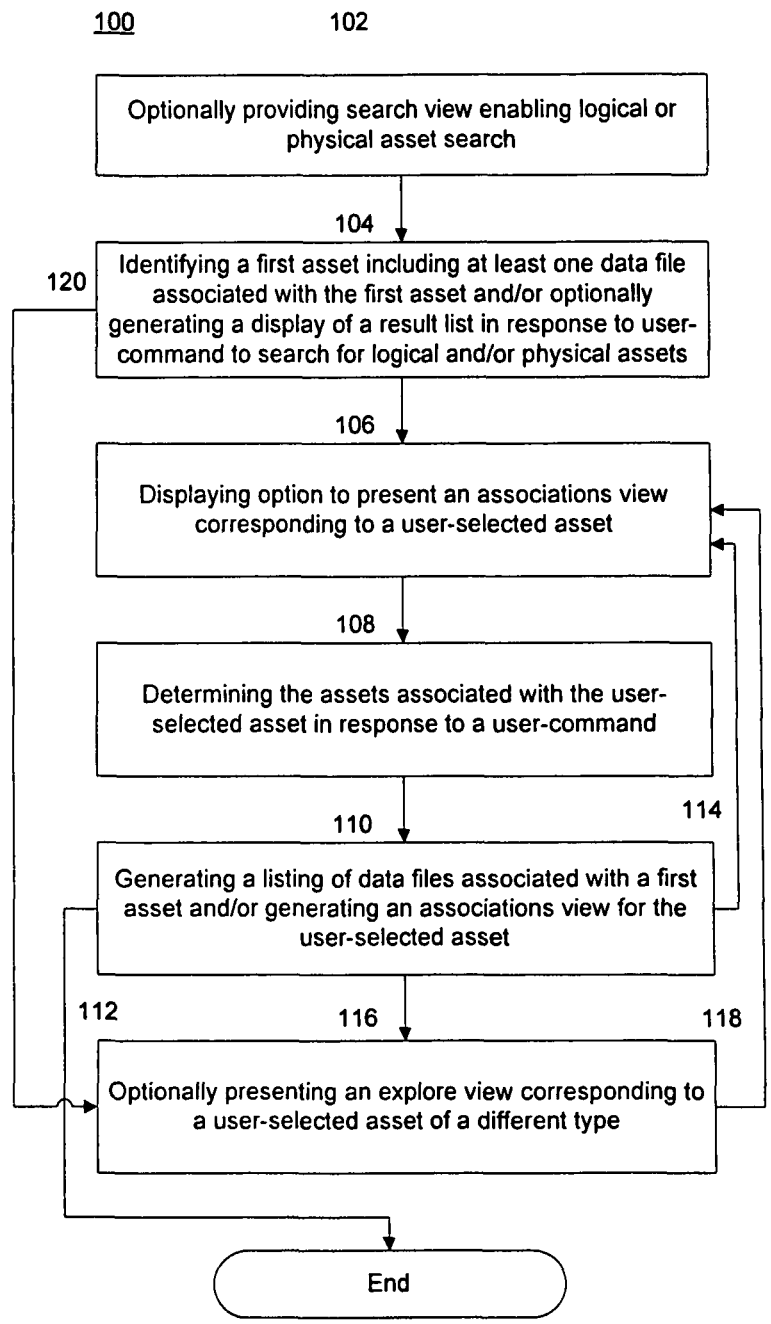
FIG. 1 is a flow diagram depicting an exemplary method for presenting associations between data files and data compositions and for enabling a user to bi-directionally navigate between data files and data compositions within a single user-interface.

It should be understood that the drawings are for purposes of illustrating the concepts of the present principles and are not necessarily the only possible configuration for illustrating the present principles. To facilitate understanding, identical reference numerals have been used, where possible, to designate identical elements that are common to the figures.

DETAILED DESCRIPTION

The present principles provide systems and methods for presenting and displaying data file associations and respective locations of associated data files within a single user interface. Additionally, an aspect of the present principles permits a user to navigate bi-directionally through data files and associated data compositions. As stated above, a data composition is a composite display or series of displays including activated data files. Implementations of the present principles are described herein below in the context of a video material media asset management system, wherein multiple users may access and interact with the system from different views. However, it should be understood that the present principles may also be applied to any type of data composition and associated data files.

In accordance with one aspect of the present principles, a video material asset management system combines one or more physical assets with other information to form a logical asset. In this illustrative system, physical assets are data files that may include video files, audio files and image files and the like. Furthermore, in this illustrative system, logical assets are data compositions that comprise a set of metadata and references to physical assets. In addition, logical assets are independent of storage location and they may represent multiple physical assets simultaneously. Moreover, logical assets may be edited or employed to edit, annotate, or otherwise utilize underlying physical assets without knowledge of their storage location.

The composite display of a logical asset can include, for example: a) physical asset viewers; b) user-editable metadata about each individual physical asset; and c) editors through which users may edit the metadata. A physical asset viewer within a logical asset enables a user to view an activated physical asset. "Activated," as employed herein, is a state in which a physical asset (data file) is opened and viewable by a user. For example, if the physical asset is a video file, the video file is activated upon opening the video file with a media player so that its video image and audio is presented. A physical asset composed of a video file is not activated upon merely displaying an icon representing a video file. Activation of a physical asset permits a user to incorporate more detailed information about the physical asset within the user-editable metadata displayed in a logical asset.

An example of user-editable metadata may include markers on video frames to facilitate location of video regions of interest by other users. Another example may include an edit decisions list, in which an editor may annotate video frames of a physical asset to enable editing the physical asset to form a new physical asset in conformance with the editor's specifications. As stated above, a logical asset also includes a metadata editor that permits addition, deletion or editing of the metadata corresponding to a physical asset.

Although not limited to these applications, logical assets can be useful to journalists, editors, producers and archivists. For example, logical assets can comprise storyboard representations of a video file or low resolution versions of a video or audio file, enabling journalists to compose a story with annotations and enabling editors to approve or reject its underlying content. Moreover, logical assets facilitate archiving because they provide a "higher-level view" of physical assets. Typical physical asset metadata, such as duration and format information, is elemental, technical and often automatically entered. In contrast, logical assets, as described above, include detailed and sophisticated annotations, enabling users to drastically refine searches for physical assets recorded on a storage medium.

One implementation of the present principles permits a user to efficiently view in a single user-interface physical assets associated with a logical asset and their storage locations. Conversely, the implementation also enables a user to view logical assets associated with a physical asset in a single user-interface. "Associated," as employed herein, refers to the relationship between a logical asset and a physical asset that is "activated," as defined above, within a composite display of the logical asset. Providing an associations view is beneficial to a user, as it may be desirable to know the logical assets associated with a physical asset. For example, prior to deleting a video clip, a journalist may want to know what other logical assets reference and utilize the video clip. Similarly, a journalist may also want to know the physical storage location of a video clip underlying a logical asset being viewed. In another aspect of the present principles, a user may navigate bi-directionally through a user-interface between a physical assets associations view and a logical assets associations view, as more fully described below.

Figures 2, 3:
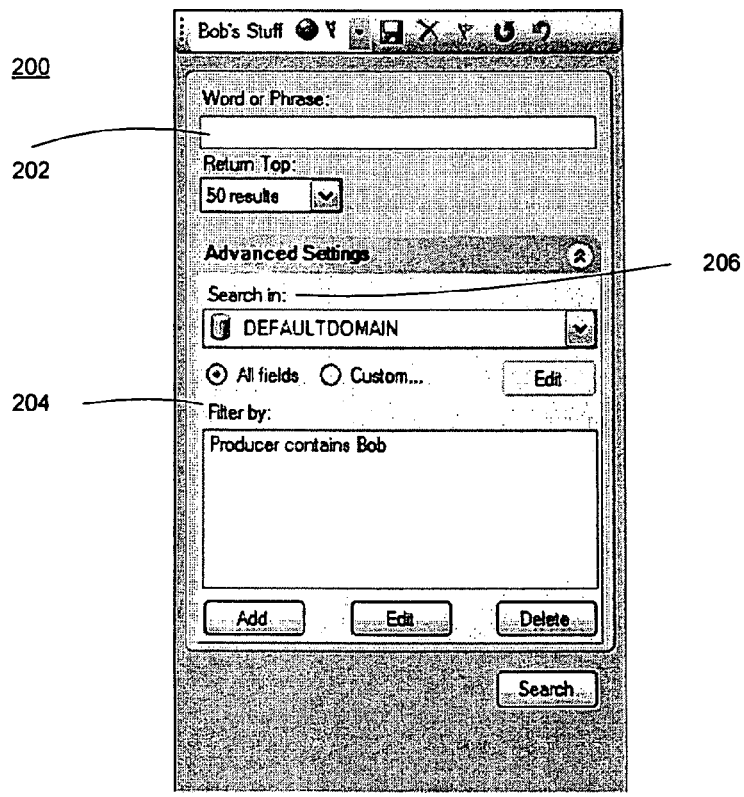
FIG. 2 is an illustration of a search view example, permitting a user to search for data files and data compositions by specifying search terms.
FIG. 3 is perspective view of an exemplary search results list displayed in accordance with user-specified search terms, from which a user may prompt the display of an associations view in one implementation of the present principles.

Referring now in specific detail to the drawings in which like reference numerals identify similar or identical elements throughout the several views, and initially to FIG. 1, an exemplary implementation of the present principles includes a method 100 for providing a display of associations of physical assets and respective logical assets. The method can begin by optionally presenting a search view 200, step 102, an example of which is depicted in FIG. 2. The search view, for example, in fields 202 and 204, prompts a user to enter search terms concerning physical assets or logical assets they wish to find. Additionally, in field 206, the search view prompts a user to enter the data storage location to search, which can include distributed data stores. Moreover, in field 204, the search view enables a user to indicate, for example, whether the method should return logical assets or physical assets.

In response to a user command to search for logical assets and/or physical assets, the method can optionally provide a user with a results list, step 104, indicating the results of a search performed in accordance with the user's specifications. The results list includes representations of physical assets and/or logical assets. This process can encompass identifying a first logical asset that includes at least one data file associated with the first logical asset. FIG. 3 provides an example of a results list 300 presented upon searching for logical assets, as specified by a user. The results list for logical assets includes information concerning the logical assets, such as, for example, the name of a logical asset 302, its creation date 304 and its source 306. In addition, the results list for logical assets can include representations 308 of the logical assets found. Similarly, an implementation of the present principles can also provide a results list corresponding to physical assets searched for in response to a user-command. A physical asset results list can be similar to the presentation of a logical assets results list to ensure ease of use. However, a physical assets results list can also include different information, such as storage location and file type, in addition to a physical asset name and creation date and the like.

After providing a results list, the method in accordance with an implementation of the present principles can display an option to present an associations view corresponding to a user-selected asset, step 106. For example, the method can enable a user to activate an associations view by selecting an entry in the results list and choosing an "associations" tab in the results list display (not shown). Alternatively, the user can select an option to activate an associations view upon highlighting an entry in the results list and selecting (e.g., left-clicking a mouse) to initiate a list including the associations view option. In response to a user-specification to provide an associations view, the method in accordance with an aspect of the present principles determines the assets associated with the selected asset, step 108.

Figure 4:
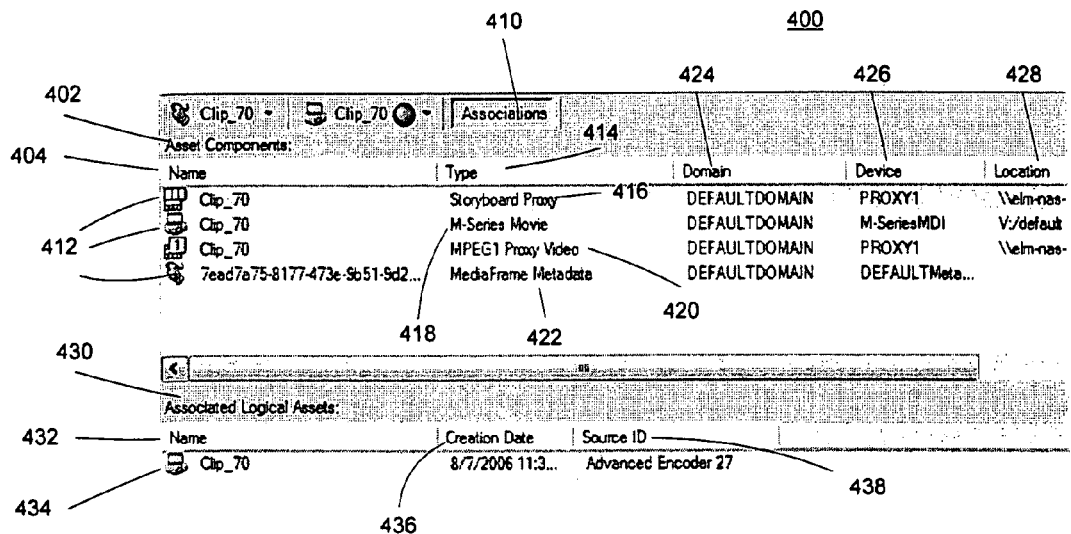
FIG. 4 is an example of a logical associations view, depicting data files associated with a specified data composition.

For example, if the results list is a logical asset results list, as depicted in FIG. 3, and the user activates an associations view for a particular logical asset, e.g., the last entry of FIG. 3, one implementation of the present principles determines the physical assets associated with the selected logical asset by examining the logical asset and identifying the physical assets referenced. Upon determining the physical assets associated with the selected logical asset, the method provides an associations view, step 110, displaying a representation of the selected logical asset 434 and listing of the physical assets 412 underlying the logical asset, sections 430 and 402, respectively, as illustrated in FIG. 4. An associations view 400 can specify the names of the logical assets and physical assets, columns 404 and 432, respectively; the type of physical assets that are associated with a selected logical asset, column 414; the storage mechanism in which the associated physical assets are stored, column 424; the devices that utilize the physical assets, column 426; the location addresses of the associated physical assets, column 428; the creation date of the selected logical asset, column 436; and the source identification of the selected logical asset, column 438. As illustrated in FIG. 4, examples of types of physical assets that can be associated with a logical asset includes a storyboard proxy 416, a movie file 418, a proxy video 420, and metadata files 422 and the like. In addition, an associations view can include an associations tab 410. Upon selection of an associations tab 410, a user can initiate another associations view for a highlighted physical or logical asset.

Figure 5:
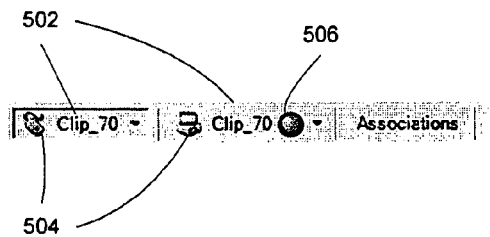
FIG. 5 is perspective view of exemplary tabs representing the most readily accessible data files within a logical asset associations view, indicating data file type and whether the data file is online.

In one implementation of the present principles, the associations view indicates the most readily available physical assets 502 associated with the selected logical asset. For example, as shown in FIGS. 4 and 5, two tabs in the upper left hand corner of a logical asset associations view, 502, indicate that the media meta frame of Clip_70 and the M-Series movie are the most readily available physical assets. Examples of physical assets that are not readily available can be, for example, those stored in an archive. Additionally, the associations view denotes whether a particular asset is online or offline 506 and its file type 504, as illustrated in FIG. 5.

It should be understood that a physical asset associations view can be provided in step 110 in the same manner as described herein with respect to the provision of a logical asset associations view. For example, a user can highlight a physical asset in a search results list and activate an associations view by selecting an associations option, as described above. The method, in step 108, determines which logical assets are associated with the selected physical asset by searching logical assets and identifying those that reference the selected physical asset. Alternatively, the method can determine the logical assets associated with the selected physical asset by referring to a stored archive listing logical assets associated with particular physical assets, composed using previous searches. The physical asset associations view can include a listing of the selected physical asset and logical assets associated with the selected physical asset. Moreover, the physical associations view can be activated through an already existing associations view or through an explore view, as described more fully below.

A listing of data files associated with a first asset can be generated for display to facilitate in presenting either a logical asset associations view or a physical asset associations view (step 110). This process, according to one implementation, can then end, step 112. In another implementation of the present principles, the user interface can optionally present a second associations view, thereby enabling bi-directional navigation with respect to logical and physical assets. In accordance with this implementation, the method can generate an associations view corresponding to any entry of an already existing associations view, whether a physical asset or a logical asset associations view. For example, a second associations view can be presented upon user-selection of any physical asset displayed in a logical assets associations view. The second associations view can be displayed upon a user choosing an associations view option, presented in step 114. The option can be included, for example, in a mouse-click options list displayed after highlighting a physical asset entry in the logical asset associations view. Alternatively, the method can initialize a second associations view upon a user highlighting a physical asset within a logical asset associations view and selecting an associations tab 410, as depicted in FIG. 4. Upon determining of the assets associated with the selected physical asset, step 108, the method presents a second associations view, step 110, including the selected physical asset and corresponding logical assets that include the selected physical asset. The method can, conversely, in the same manner present a logical associations view in response to user-selection of an associations view option for a logical asset within a physical asset associations view. The process can end, step 112, or continue, step 114, if the user should choose to activate another associations view corresponding to selected assets within a previously presented associations view.

Thus, in accordance with an aspect of the present principles, the method enables a user to view associations between physical assets and respective logical assets within a single user-interface. Furthermore, the interface provides a bi-directional navigation mechanism between physical assets and logical assets, as a user can activate a physical asset associations window by selecting a physical asset listed in a logical asset associations window. Conversely, the interface also permits a user to activate a logical asset associations window by selecting a logical asset in a physical asset associations window.

Figure 6:
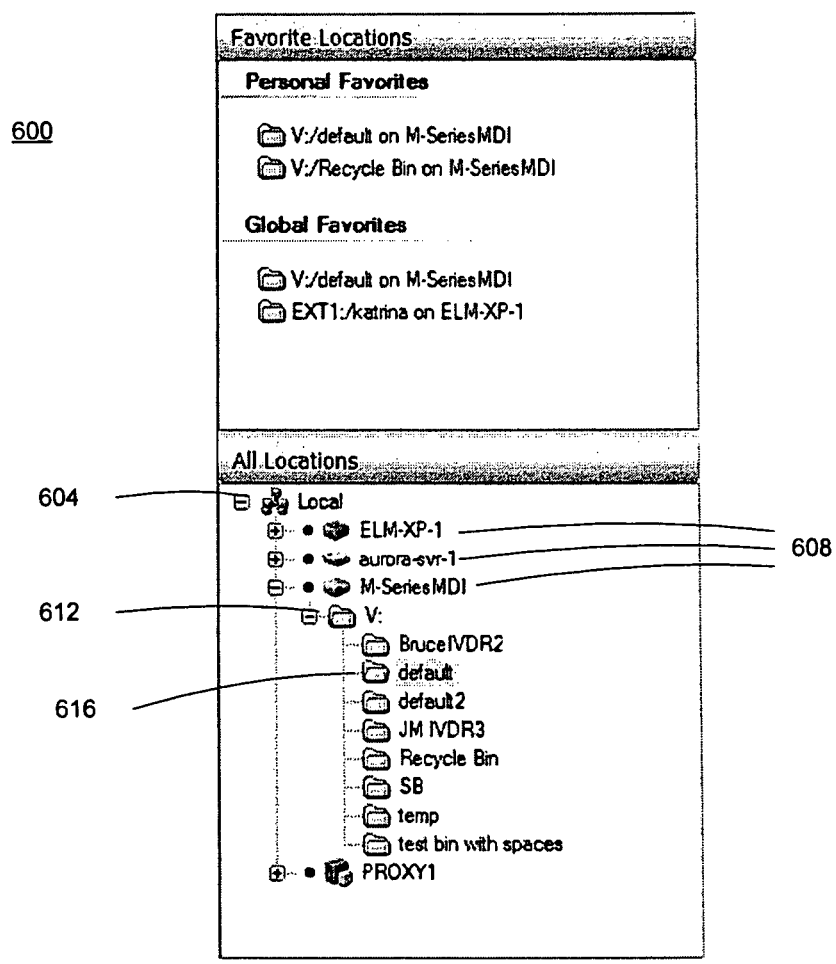
FIG. 6 is an example of an explore view, in which users may navigate through a storage medium.

According to another aspect of the present principles, the user interface can optionally display an explore view that is activated upon user selection of a physical asset entry in an associations view, step 116, or in a search results list, step 120. For example, a user can highlight a physical asset entry in an associations view or a results list, select (e.g., left-click a mouse) to present a listing including an explore view option, and choose the explore view option. In response to user-selection of an explore view option with respect to a physical asset, the method can display an explore view, including a representation of the physical asset and indicating the location of the physical asset in a hierarchy of storage devices and storage locations. An example of an explore view 600 is depicted in FIG. 6. The explore view 600 can include a representation of a local network 604. A user can initiate the display of representations of storage mediums 608 upon selection of a local network 604. The explore view permits a user to navigate through folders 612 and subfolders 616 to view physical assets stored within them. In addition, the explore view can enable a user to delete, rename and transfer physical assets and the like.

In one implementation of the present principles, the user-interface can activate a physical asset associations view upon user-selection of an associations view option in the explore view, step 118. For example, a user can highlight a physical asset in the explore view and initialize an options list including an associations view option. After user-selection of the associations view option, the user-interface can display a physical asset associations view, steps 108-110, providing a listing of the selected physical asset and associated logical assets. It should also be noted that the explore view can also be initialized independently of a results list and an associations view.

Figure 7:
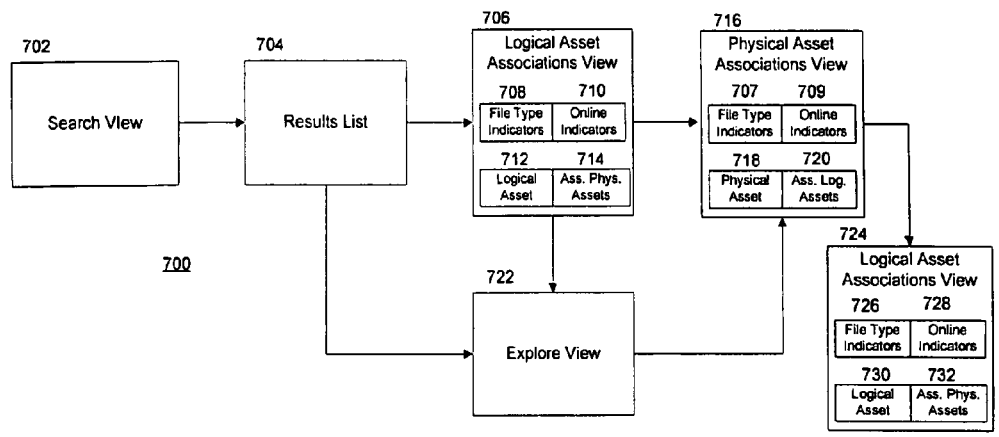
FIG. 7 is a flow diagram of an exemplary system in accordance with the present principles, illustrating bi-directional navigation capability between a physical asset associations view and a logical asset associations view upon displaying a logical asset associations view.

A system 700 in accordance with an aspect of the present principles is depicted in FIG. 7. The system includes views described above concerning method implementations: an optional search view 702, prompting a user to enter search terms for logical or physical assets; an optional results view 704, indicating a listing of logical assets identified in response to user-specification of search terms and a user-command to institute the search; a first associations view 706, listing, for example, physical assets associated with a selected logical asset 714 and the selected logical asset 712, and including file type 708 and online 710 indicators, as described above; an optional explore view 722, activated in response to user-selection of a particular physical asset, depicting a storage location of the physical asset; an optional second associations view 716, presented in response to user-selection of a physical asset within the logical asset associations view 706 or within the explore view 722, listing, for example, logical assets associated with a selected physical asset 720 and the selected physical asset 718, and including file type 707, and online 709 indicators, as described above; and an optional third associations view 724, presented in response to user-selection of a logical asset within the physical asset associations view 716, listing, for example, physical assets associated with the user-selected logical asset 732 and the user-selected logical asset 730, and including file type 726 and online 728 indicators, as described above.

Figure 8:
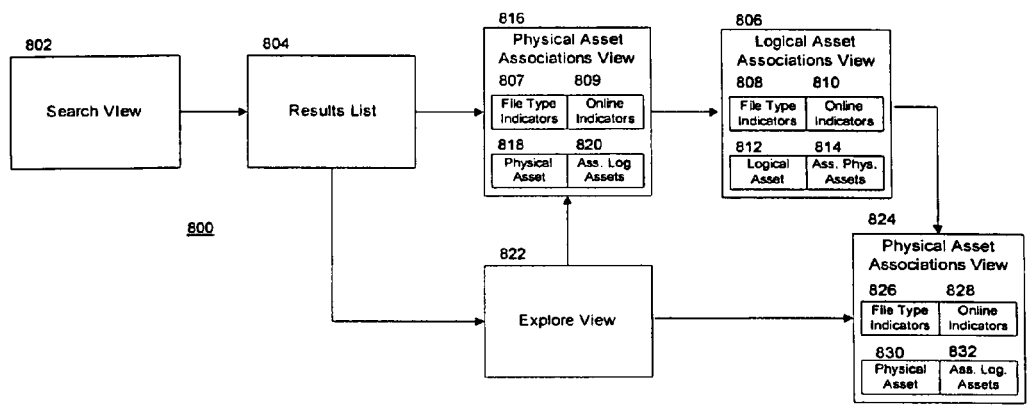
FIG. 8 is a flow diagram of an exemplary system in accordance with the present principles, illustrating bi-directional navigation capability between a physical asset associations view and a logical asset associations view upon displaying a physical asset associations view.

Another system 800 in accordance with an aspect of the present principles is illustrated in FIG. 8, including views described above concerning method implementations: an optional search view 802, prompting a user to enter search terms for logical or physical assets; an optional results view 804, indicating a listing of physical assets identified in response to user-specification of search terms and a user-command to institute the search; a first associations view 816, listing, for example, logical assets associated with a selected physical asset 820 and the selected physical asset 818, and including file type 807 and online 809 indicators, as described above; an optional explore view 822, activated in response to user-selection of a particular physical asset, depicting the storage location of the physical asset; an optional second associations view 806, presented in response to user-selection of a logical asset within the physical assets associations view 816, listing, for example, physical assets associated with a selected logical asset 814 and the selected logical asset 812, and including file type, 808, and online, 810, indicators, as described above; and an optional third associations view 824, presented in response to user-selection of a physical asset within the logical asset associations view 806 or within the explore view 822, listing, for example, logical assets associated with the user-selected logical asset 832 and the user-selected logical asset 830, and including file type 826 and online 828 indicators, as described above.

It should be understood that the implementations described herein may be implemented in, for example, a method or process, an apparatus, or a software program employing a graphical user interface. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include devices, such as, for example, computers, cell phones, portable/personal digital assistants ("PDAs"), and other computing devices.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A method of displaying data file associations, comprising:
receiving a search query;
using a processor to identify, in response to the search query, results including at least one data composition or at least one data file corresponding to the search query, wherein each data composition comprises metadata and references to one or more data files, and wherein each data file is referenced by one or more data compositions;
displaying a listing of the identified results;
receiving a selection of a data composition or a data file from the listing of identified results;
displaying a selectable option to present an association view corresponding to the selection from the listing of identified results;
upon selection of said selectable option:
determining whether the selection from the listing of identified results is a data composition or a data file;
upon determination that the selection from the listing of identified results is a data composition, generating and displaying on a first association view a listing of data files that are referenced by the data composition that is the selection from the listing of identified results; and
upon determination that the selection from the listing of identified results is a data file, generating and displaying within a first association view a listing of data compositions that reference the data file that is the selection from the listing of identified results,
wherein the displaying of the association view listing data files referenced by a data composition provides an indication of which data files are activated, and
wherein the listing provided within the first association view permits selection of an item within the listing, wherein a second association view is generated and displayed listing the data files referenced by the item if the item is a data composition or listing the data compositions that reference the item if the item is a data file from the first association view, and wherein selections from the second association view update the listing of the first association view and selections from the first association view update the listing of the second association view in an ongoing bi-directional manner.

2. The method of claim 1 further comprising the step of: presenting a representation of a selected data file within a hierarchical storage structure indicating the location of the selected data file in a storage medium in response to a user-command.

3. The method of claim 1 further comprising the step of: indicating accessible data files in the first association view.

4. The method of claim 1, wherein the method is performed as part of a media content material asset management process, and wherein data files comprise media content.

5. The method of claim 1, wherein generating a listing of data compositions comprises:
referring to a stored archive listing data compositions associated with data files to determine one or more data compositions associated with the data file that is the selection from the listing of identified results, wherein the stored archive listing is composed using previous searches.

6. A system for displaying data file associations, comprising:
a processor configured to:
receive a search query;
identify, in response to the search query, results including at least one data composition or at least one data file corresponding to the search query, wherein each data composition comprises metadata and references to one or more data files, and wherein each data file is referenced by one or more data compositions;
display a listing of the identified results;
receive a selection of a data composition or a data file from the listing of identified results;
display a selectable option to present an association view corresponding to the selection from the listing of identified results;
upon selection of said selectable option:
determine whether the selection from the listing of identified results is a data composition or a data file;
upon determination that the selection from the listing of identified results is a data composition, generate and display on a first association view a listing of data files that are referenced by the data composition that is the selection from the listing of identified results; and
upon determination that the selection from the listing of identified results is a data file, generate and display within a first association view a listing of data compositions that reference the data file that is the selection from the listing of identified results,
wherein the display of the association view listing data files referenced by a data composition provides an indication of which data files are activated, and
wherein the listing provided within the first association view permits selection of an item within the listing, wherein a second association view is generated and displayed listing the data files referenced by the item if the item is a data composition or listing the data compositions that reference the item if the item is a data file from the first association view, and wherein selections from the second association view update the listing of the first association view and selections from the first association view update the listing of the second association view in an ongoing bi-directional manner.

7. The system of claim 6, wherein the system comprises a media content material asset management system, and wherein data files comprise media content material.

8. The system of claim 6, wherein the processor is further configured to:
present a representation of a selected data file within a hierarchical storage structure indicating the location of the selected data file in a storage medium in response to a user-command.

9. The system of claim 6, wherein processor is further configured to:
indicate accessible data files in the first association view.

10. The system of claim 6, wherein generating a listing of data compositions includes referring to a stored archive listing data compositions associated with data files to determine one or more data compositions associated with the data file that is the selection from the listing of identified results, wherein the stored archive listing is composed using previous searches.

* * * * *